United States Patent
Salituri et al.

(10) Patent No.: US 10,521,099 B2
(45) Date of Patent: *Dec. 31, 2019

(54) SYSTEMS AND METHODS FOR PROVIDING INTERACTIVITY FOR PANORAMIC MEDIA CONTENT

(71) Applicant: Facebook, Inc., Menlo Park, CA (US)

(72) Inventors: Andrew Gavin Salituri, Seattle, WA (US); Winston Felix Popowicz Handte, New York, NY (US); Michael Coleman O'Beirne, New York, NY (US)

(73) Assignee: Facebook, Inc., Menlo Park, CA (US)

(*) Notice: Subject to any disclaimer, the term of this patent is extended or adjusted under 35 U.S.C. 154(b) by 301 days.

This patent is subject to a terminal disclaimer.

(21) Appl. No.: 14/839,794

(22) Filed: Aug. 28, 2015

(65) Prior Publication Data
US 2017/0060372 A1    Mar. 2, 2017

(51) Int. Cl.
*G06F 3/048* (2013.01)
*G06F 3/0485* (2013.01)
*G06F 3/0481* (2013.01)

(52) U.S. Cl.
CPC .......... *G06F 3/0485* (2013.01); *G06F 3/0481* (2013.01)

(58) Field of Classification Search
CPC . G06F 3/0485; G06F 3/0481; H04N 5/23238; G06T 3/4038
See application file for complete search history.

(56) References Cited

U.S. PATENT DOCUMENTS

| | | | |
|---|---|---|---|
| 5,553,225 A | 9/1996 | Perry | |
| 5,956,032 A | 9/1999 | Argiolas | |
| 6,008,807 A | 12/1999 | Bretschneider | |
| 6,084,592 A * | 7/2000 | Shum | G06T 17/00 345/420 |
| 6,157,381 A | 12/2000 | Bates | |
| 7,206,017 B1 | 4/2007 | Suzuki | |
| 8,982,154 B2 * | 3/2015 | Vincent | G06T 17/05 345/419 |

(Continued)

OTHER PUBLICATIONS

Black Paw: https://www.youtube.com/watch?v=3J0VsdaNODk Mar. 6, 2012.*

(Continued)

*Primary Examiner* — Pei Yong Weng
(74) *Attorney, Agent, or Firm* — Sheppard Mullin Richter & Hampton LLP

(57) ABSTRACT

In some cases, a panoramic media content item to be displayed can be acquired. An interface including a viewable area for displaying at least a portion of the content item can be generated. Based on a size of the content item, a scroll bar can be generated, within the interface, for scrolling the content item. Based on a size of the viewable area, a scroll element can be generated, within the scroll bar, to be movable based on user interactions to scroll the content item. In some cases, at least a first portion of the content item can be automatically scrolled through such that the viewable area displays, over time, at least a second portion of the content item. In some cases, a leftmost or rightmost edge of the content item is displayable via the viewable area. A transitional animation associated with the leftmost or rightmost edge can be performed.

20 Claims, 18 Drawing Sheets

(56) References Cited

U.S. PATENT DOCUMENTS

| | | | |
|---|---|---|---|
| 9,189,839 B1* | 11/2015 | Sheridan | G06T 5/50 |
| 9,208,177 B2* | 12/2015 | Petrou | G06F 17/30256 |
| 9,342,911 B1* | 5/2016 | Sheridan | G06T 5/50 |
| 9,781,356 B1* | 10/2017 | Banta | H04N 5/2628 |
| 2002/0126155 A1 | 9/2002 | Lin-Hendel | |
| 2004/0165101 A1* | 8/2004 | Miyanari | H04N 5/361 |
| | | | 348/363 |
| 2005/0034077 A1 | 2/2005 | Jaeger | |
| 2005/0190280 A1* | 9/2005 | Haas | G06F 3/0485 |
| | | | 348/333.05 |
| 2006/0023090 A1* | 2/2006 | Takata | H04N 5/2624 |
| | | | 348/239 |
| 2006/0034367 A1* | 2/2006 | Park | H04N 19/61 |
| | | | 375/240.01 |
| 2008/0034316 A1* | 2/2008 | Thoresson | G06F 3/04855 |
| | | | 715/781 |
| 2008/0201225 A1 | 8/2008 | Maharajh | |
| 2009/0064014 A1 | 3/2009 | Nelson | |
| 2010/0123737 A1* | 5/2010 | Williamson | G01C 21/3647 |
| | | | 345/672 |
| 2010/0189358 A1* | 7/2010 | Kaneda | G06K 9/00744 |
| | | | 382/195 |
| 2011/0022985 A1 | 1/2011 | Ording | |
| 2012/0011432 A1* | 1/2012 | Strutton | G06Q 30/02 |
| | | | 715/234 |
| 2013/0058633 A1* | 3/2013 | Hoshino | H04N 5/783 |
| | | | 386/344 |
| 2013/0263029 A1* | 10/2013 | Rossi | G06F 3/04883 |
| | | | 715/764 |
| 2014/0137031 A1 | 5/2014 | Aoki | |
| 2014/0160119 A1* | 6/2014 | Vincent | G06T 17/05 |
| | | | 345/419 |
| 2014/0164938 A1* | 6/2014 | Petterson | G06F 3/0482 |
| | | | 715/739 |
| 2014/0172881 A1* | 6/2014 | Petrou | G06F 17/30256 |
| | | | 707/748 |
| 2014/0194164 A1* | 7/2014 | Lee | G06F 3/0485 |
| | | | 455/566 |
| 2014/0223307 A1* | 8/2014 | McIntosh | G11B 27/105 |
| | | | 715/719 |
| 2014/0229834 A1* | 8/2014 | Jain | G06F 3/0488 |
| | | | 715/720 |
| 2014/0267441 A1 | 9/2014 | Matas et al. | |
| 2015/0350735 A1* | 12/2015 | Koser | H04N 21/435 |
| | | | 725/37 |
| 2016/0217826 A1* | 7/2016 | McIntosh | G11B 27/105 |
| 2018/0232121 A1 | 8/2018 | Lewis | |

OTHER PUBLICATIONS

Marzipano Tool (description, usage document, and demonstration panoramic images). retrieved from http://www.marzipano.net, available to the public as of Jun. 7, 2015; retrieved via Internet Archive on [Dec. 4, 2018], 6 pages. (Year: 2015).*

FreeWebTeacher, "Resizing a Window," YouTube video located at https://www.youtube.com/watch?v=e3XntupxxtA, Mar. 17, 2009.

Google Inc. "Google Maps Street View—launch video," YouTube video located at https://www.youtube.com/watch?v=91wuBqIny50, May 29, 2007.

Seruni Photography, "Top 10 Photographer, 360 Panorama, 360 Panoramic Photography," YouTube video located at https://www.youtube.com/watch?v=00LJoDCWCeM, May 23, 2015.

* cited by examiner

SYSTEMS AND METHODS FOR PROVIDING INTERACTIVITY FOR PANORAMIC MEDIA CONTENT

FIELD OF THE INVENTION

The present technology relates to the field of media processing. More particularly, the present technology relates to techniques for providing interactivity for panoramic media content.

BACKGROUND

Today, people often utilize computing devices (or systems) for a wide variety of purposes. Users can use their computing devices to, for example, interact with one another, access content, share content, and create content. In some cases, a user of a social networking system (or service) can utilize his or her computing device to create and post (or publish) media content items, such as images, videos, audio, and text. In one example, the user can post one or more panoramic images via his or her account with the social networking system, such as by posting to the user's profile, wall, or timeline. In this example, one or more social connections (or friends) of the user can view or access the one or more panoramic images posted by the user, in accordance with the user's privacy settings or preferences.

However, in accordance with conventional approaches, panoramic media content items are generally provided in an uninteresting, inconvenient, or unappealing manner. In one example, conventional approaches generally present panoramic images in a static or boring manner. In another example, under conventional approaches, panoramic media content items are scaled down in size such that the entireties of the panoramic media content items are presentable, but with lower image quality. As such, conventional approaches can create challenges for or reduce the overall user experience associated with utilizing panoramic media content.

SUMMARY

Various embodiments of the present disclosure can include systems, methods, and non-transitory computer readable media configured to acquire a panoramic media content item to be displayed. An interface including a viewable area for displaying at least a portion of the panoramic media content item can be generated. A scroll bar can be generated, within the interface, for scrolling the panoramic media content item. The scroll bar can be generated based on a size of the panoramic media content item. A scroll element can be generated, within the scroll bar, to be movable based on one or more user interactions to scroll the panoramic media content item. The scroll element can be generated based on a size of the viewable area included in the interface.

In an embodiment, a size of the scroll bar can be proportional, within an allowable deviation, to the size of the panoramic media content item. A size of the scroll element can be proportional, within the allowable deviation, to the size of the viewable area.

In an embodiment, a change to the size of the viewable area can be detected. The size of the scroll element and the size of the scroll bar can be modified, in response to the change to the size of the viewable area, such that a first ratio between the size of the scroll element and the size of the scroll bar is representative of a second ratio between the size of the viewable area and the size of the panoramic media content item.

In an embodiment, the interface can be presented via a web browser window. The change to the size of the viewable area can be caused by a change in size to the web browser window.

In an embodiment, a change to the size of the viewable area can be detected. It can be determined whether to modify the scroll element, based on the change to the size of the viewable area, to result in the scroll element having a modified scroll element size. It can be determined whether to modify the scroll bar, based on the change to the size of the viewable area, to result in the scroll bar having a modified scroll bar size.

In an embodiment, determining whether to modify the scroll element can include determining whether the modified scroll element size satisfies at least one of a scroll element minimum size requirement or a scroll element maximum size requirement. Determining whether to modify the scroll bar can include determining whether the modified scroll bar size satisfies at least one of a scroll bar minimum size requirement or a scroll bar maximum size requirement.

In an embodiment, the scroll element can be modified, based on the change to the size of the viewable area, to result in the scroll element having the modified scroll element size when the modified scroll element size satisfies the at least one of the scroll element minimum size requirement or the scroll element maximum size requirement. The scroll bar can be modified, based on the change to the size of the viewable area, to result in the scroll bar having the modified scroll bar size when the modified scroll bar size satisfies the at least one of the scroll bar minimum size requirement or the scroll bar maximum size requirement.

In an embodiment, the scroll element and the scroll bar can be modified with respect to a horizontal axis. The scroll element and the scroll bar can be unmodified with respect to a vertical axis.

In an embodiment, the one or more user interactions can be associated with at least one of: 1) a first mouse operation performed with respect to the scroll bar, 2) a second mouse operation performed with respect to at least the portion of the panoramic media content item, 3) a first touch gesture performed with respect to the scroll bar, 4) a second touch gesture performed with respect to at least the portion of the panoramic media content item, or 5) a tilting gesture performed with respect to the system.

In an embodiment, the scroll bar can be presented in an at least partially transparent color. The scroll element can be presented with less transparency than the at least partially transparent color.

Moreover, various embodiments of the present disclosure can include systems, methods, and non-transitory computer readable media configured to acquire a panoramic media content item to be displayed in a feed. An interface including a viewable area for displaying at least a first portion of the panoramic media content item in the feed can be generated. At least the first portion of the panoramic media content item can be automatically scrolled through such that the viewable area displays, over time, at least a second portion of the panoramic media content item.

In an embodiment, one or more user interactions performed with respect to at least the first portion or at least the second portion of the panoramic media content item can be detected. The panoramic media content item can be scrolled, based on the one or more user interactions, such that the viewable area displays at least a third portion of the panoramic media content item. At least the third portion of the panoramic media content item can be automatically scrolled through when the one or more user interactions have ceased.

In an embodiment, the one or more user interactions can be associated with at least one of: 1) a mouse hover operation, 2) a mouse click operation, or 3) a touch gesture operation.

In an embodiment, it can be detected that the one or more user interactions have ceased. A movement direction with which the one or more user interactions had most recently been associated can be determined. At least the third portion of the panoramic media content item can be automatically scrolled through in the movement direction.

In an embodiment, automatically scrolling through at least the first portion of the panoramic media content item can be initiated when the viewable area is at least partially rendered on a display element. Automatically scrolling through at least the first portion of the panoramic media content item can be ceased when the viewable area is absent from being rendered on the display element.

In an embodiment, the panoramic media content item can include one or more points of interest.

In an embodiment, at least the second portion of the panoramic media content item can depict the one or more points of interest. A speed for automatically scrolling through at least the second portion of the panoramic media content item can be decreased.

In an embodiment, the one or more points of interest can be associated with at least one of a tagged object, a detected object, or a recognized object.

In an embodiment, the tagged object can include at least one of a tagged location or a tagged entity. The detected object can include a detected face object identified using a face detection process. The recognized object can include at least one of an object identified using an image classification process or a recognized face object identified using a face recognition process.

In an embodiment, the interface can be associated with a post within a social networking system. The feed can be associated with at least one of a newsfeed or a timeline of the social networking system. The post can be presented via the at least one of the newsfeed or the timeline newsfeed of the social networking system.

Furthermore, various embodiments of the present disclosure can include systems, methods, and non-transitory computer readable media configured to acquire a panoramic media content item to be displayed. An interface including a viewable area for displaying at least a first portion of the panoramic media content item can be generated. The panoramic media content item in a first direction can be automatically scrolled through such that the viewable area displays, over time, at least a second portion of the panoramic media content item. It can be determined that at least one of a leftmost edge or a rightmost edge of the panoramic media content item is displayed via the viewable area. A transitional animation associated with the at least one of the leftmost edge or the rightmost edge of the panoramic media content item can be performed.

In an embodiment, the transitional animation can include automatically scrolling the panoramic media content item in a second direction different from the first direction.

In an embodiment, the first direction and the second direction can be along a horizontal axis. The second direction can be opposite to the first direction.

In an embodiment, the transitional animation can include automatically scrolling the panoramic media content item in the first direction such that the leftmost edge and the rightmost edge appear to be connected together. The transitional animation can be continuously repeatable.

In an embodiment, information associated with a user to whom the panoramic media content item is to be displayed can be acquired. The information can be analyzed to identify one or more content consumption properties associated with the user. At least one of a speed or a timing factor associated with automatically scrolling the panoramic media content item can be adjusted based on the one or more content consumption properties.

In an embodiment, the information can include historical usage data about the user.

In an embodiment, the one or more content consumption properties can be indicative of a pace at which the user consumes content.

In an embodiment, size information associated with the panoramic media content item can be acquired. At least one of a speed or a timing factor associated with automatically scrolling the panoramic media content item can be adjusted based on the size information.

In an embodiment, a second interface for presenting a full view of the panoramic media content item can be generated.

In an embodiment, at least one interactive element for switching between the full view and the viewable area can be provided.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
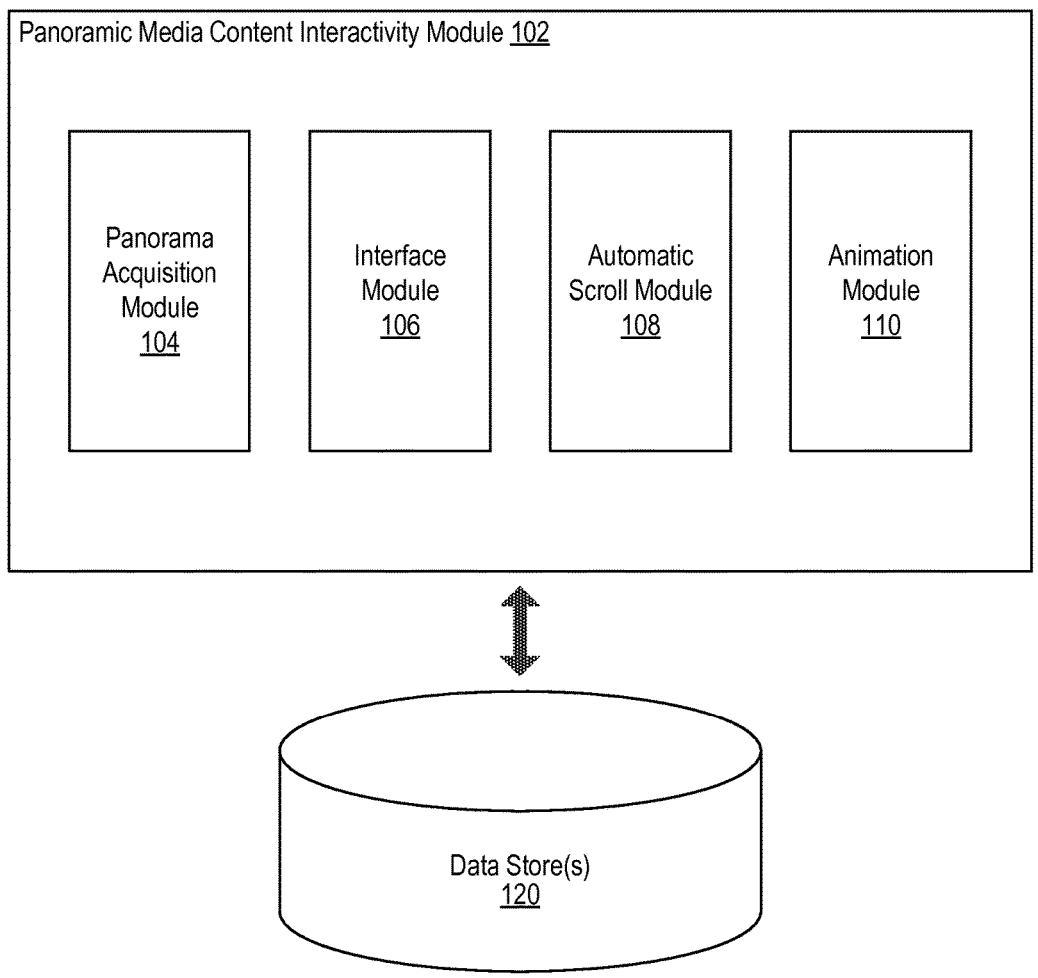
FIG. 1 illustrates an example system including an example panoramic media content interactivity module configured to facilitate providing interactivity for panoramic media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Interactivity for Panoramic Media Content

People use computing devices (or systems) for a wide variety of purposes. Computing devices can provide different kinds of functionality. Users can utilize their computing devices to produce information, access information, and share information. In some cases, computing devices can include or correspond to cameras capable of capturing, recording, or acquiring media content, such as images, videos, audio, and/or text. In some instances, computing devices can also be utilized to view or access such media content. For example, a user can use his or her computing device to acquire a panoramic media content item, such as a panoramic image, and publish the panoramic media content item. Continuing with this example, another user can utilize his or her computing device to view or access the published panoramic media content item.

However, conventional approaches to providing panoramic media content are generally dull, inefficient, and/or unappealing. In one example, under conventional approaches, panoramic images are presented, displayed, or otherwise presented in a static manner that lacks significant interactivity. In another example, in accordance with conventional approaches, panoramic images are presented in a width-constrained environment, such as a feed environment or a profile environment within a social networking system. In this example, conventional approaches typically scale down the panoramic images such that the entireties (e.g., entire widths) of the panoramic images become presentable within the width-constrained environment. As a result, the panoramic images are presented with lower image quality (e.g., lower resolutions) due to the downscaling. Moreover, in this example, there can often times be significant black or empty regions presented above and below the scaled-down entireties of the panoramic images, which can be an inefficient use of display space.

As such, conventional approaches can be inefficient, inconvenient, and/or otherwise lacking. Therefore, an improved approach can be beneficial for addressing or alleviating various concerns associated with conventional approaches. The disclosed technology can provide, inter alia, interactivity for panoramic media content. Various embodiments of the present disclosure can acquire a panoramic media content item to be displayed. An interface including a viewable area for displaying at least a portion of the content item can be generated. Based on a size of the content item, a scroll bar can be generated, within the interface, for scrolling the content item. Based on a size of the viewable area, a scroll element can be generated, within the scroll bar, to be movable based on user interactions to scroll the content item. In some cases, at least a first portion of the content item can be automatically scrolled through such that the viewable area displays, over time, at least a second portion of the content item. In some cases, a leftmost or rightmost edge of the content item can be displayable via the viewable area. A transitional animation associated with the leftmost or rightmost edge can be performed. It is contemplated that there can be many variations and/or other possibilities.

FIG. 1 illustrates an example system 100 including an example panoramic media content interactivity module 102 configured to facilitate providing interactivity for panoramic media content, according to an embodiment of the present disclosure. As shown in the example of FIG. 1, the example panoramic media content interactivity module 102 can include a panorama acquisition module 104, an interface module 106, an automatic scroll module 108, and an animation module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the panoramic media content interactivity module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the panoramic media content interactivity module 102 can be implemented, in part or in whole, as software running on one or more computing devices or systems, such as on a user or client computing device. For example, the panoramic media content interactivity module 102 or at least a portion thereof can be implemented as or within an application (e.g., app), a program, or an applet, etc., running on a user computing device or a client computing system, such as the user device 710 of FIG. 7. In another example, the panoramic media content interactivity module 102 or at least a portion thereof can be implemented using one or more computing devices or systems that include one or more servers, such as network servers or cloud servers. In some instances, the panoramic media content interactivity module 102 can, in part or in whole, be implemented within or configured to operate in conjunction with a social networking system (or service), such as the social networking system 730 of FIG. 7. It should be understood that there can be many variations or other possibilities.

The panorama acquisition module 104 can be configured to facilitate acquiring a panoramic media content item (i.e., a panorama) to be displayed. The panorama acquisition module 104 can acquire the panoramic media content item by identifying, selecting, receiving, and/or receiving a selection of, etc., the panoramic media content item. In some instances, the panorama acquisition module 104 can acquire the panorama when a user provides or upload the panorama. In some cases, the panorama acquisition module 104 can acquire the panorama when another user views, accesses, selects, or interacts with the panorama. For instance, the panorama acquisition module 104 can acquire panoramas, such as panoramic images or panoramic videos, when users provide, upload, or post panoramas to the social networking system and/or when users view, click on, tap on, or access panoramas via the social networking system.

In some embodiments, the acquired panorama (i.e., the acquired panoramic media content item) can be displayed. In one example, the panoramic media content interactivity module 102 can cause the panorama to be displayed via a computing device (or system) of a user who recorded, captured, provided, and/or uploaded the panorama. In another example, the panoramic media content interactivity module 102 can cause the panorama to be displayed via another computing device of another user who is interacting with the panorama, such as when the panorama is accessed and displayed via a feed (e.g., a social networking system newsfeed, a social networking system timeline/profile/wall, etc.) of the other user. It should be appreciated that many variations are possible.

Moreover, the interface module 106 can be configured to facilitate generating an interface including a viewable area for displaying at least a portion of the panoramic media content item. The interface module 106 can also be configured to facilitate generating a scroll bar (e.g., a slide bar), within the interface, for scrolling the panoramic media content item. The scroll bar can be generated based on a size of the panoramic media content item. The interface module 106 can further be configured to facilitate generating a scroll element (e.g., a slider), within the scroll bar, to be movable based on one or more user interactions to scroll the panoramic media content item. The scroll element can be generated based on a size of the viewable area included in the interface. The interface module 106 will be discussed in more detail below with reference to FIG. 2A.

Further, the automatic scroll module 108 can be configured to facilitate automatically scrolling through at least a first portion of the panoramic media content item such that the viewable area displays, over time, at least a second portion of the panoramic media content item. For example, the automatic scroll module 108 can facilitate automatically scrolling the panoramic media content item in a first direction such that the viewable area displays at least the first portion and then, over time, at least the second portion of the panoramic media content item. More details regarding the automatic scroll module 108 will be provided below with reference to FIG. 2B.

Additionally, the animation module 110 can be configured to facilitate determining that at least one of a leftmost edge or a rightmost edge of the panoramic media content item is displayed via the viewable area. The animation module 110 can also be configured to facilitate performing a transitional animation associated with the at least one of the leftmost edge or the rightmost edge of the panoramic media content item. The animation module 110 will be discussed in more detail below with reference to FIG. 2C.

Furthermore, in some embodiments, the panoramic media content interactivity module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, user specified settings, content produced by users, and various other types of user data. In some embodiments, the at least one data store 120 can store information that is utilizable by the panoramic media content interactivity module 102, such as data representative of or otherwise associated with panoramic media content. Again, it should be appreciated that there can be many variations and other possibilities.

Figure 2A:
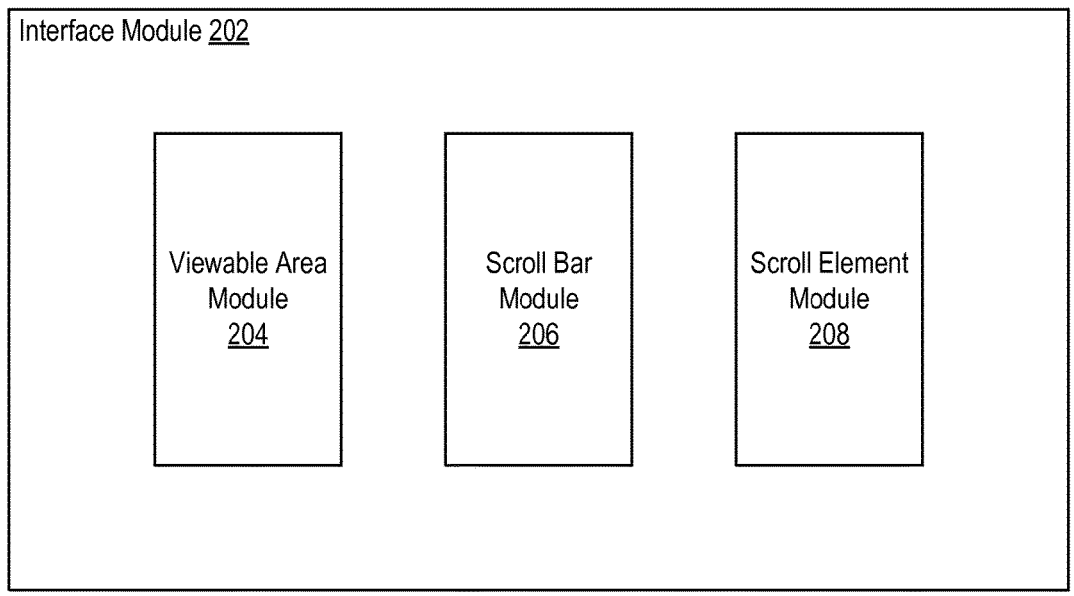
FIG. 2A illustrates an example interface module configured to facilitate providing interactivity for panoramic media content, according to an embodiment of the present disclosure.

FIG. 2A illustrates an example interface module 202 configured to facilitate providing interactivity for panoramic media content, according to an embodiment of the present disclosure. In some embodiments, the interface module 106 of FIG. 1 can be implemented as the example interface module 202. As shown in FIG. 2A, the example interface module 202 can include a viewable area module 204, a scroll bar module 206, and a scroll element module 208.

As discussed above, the interface module 202 can facilitate generating an interface including a viewable area for displaying at least a portion of an acquired panoramic media content item. In some embodiments, the interface module 202 can utilize the viewable area module 204 to generate the viewable area included in the interface. The viewable area can be generated to appear to be visually smaller than the full size of the panoramic media content item. For example, the panoramic media content item can be horizontally wider than the viewable area, such that only a particular portion of the panoramic media content item is shown or displayed via the viewable area, while portions other than the particular portion extend beyond the boundaries of the viewable area and thus are not being displayed.

Moreover, the interface module 202 can utilize the scroll bar module 206 to generate a scroll bar, within the interface, for scrolling the panoramic media content item. The scroll bar can be generated, by the scroll bar module 206, based on a size of the panoramic media content item. In some embodiments, the scroll bar module 206 can generate the scroll bar such that a size of the scroll bar is proportional, within an allowable deviation, to the size of the panoramic media content item. In some instances, the scroll bar can be generated with a planar size that is proportional (i.e., within an allowable deviation) to a planar size of the panoramic media content item. In some cases, one or more dimensions, such as a width and/or a height, of the scroll bar can be respectively proportional to one or more dimensions of the panoramic media content item.

Additionally, the interface module 202 can utilize the scroll element module 208 to generate a scroll element, within the scroll bar, to be movable based on one or more user interactions to scroll the panoramic media content item. The interface module 202 can also be configured to detect the one or more user interactions for moving the scroll element and scrolling the panoramic media content item. In some embodiments, the one or more user interactions can be associated with a first mouse operation performed with respect to the scroll bar (e.g., clicking and dragging the scroll element within the scroll bar, clicking a scroll bar area excluding the scroll element, etc.), a second mouse operation performed with respect to at least the portion of the panoramic media content item (e.g., clicking and dragging the portion), a first touch gesture performed with respect to the scroll bar (e.g., tapping and dragging the scroll element within the scroll bar, tapping a scroll bar area excluding the scroll element, etc.), a second touch gesture performed with respect to at least the portion of the panoramic media content item (e.g., tapping and dragging the portion), and/or a tilting gesture performed with respect to the system. Each of these example operations and/or gestures can cause the panoramic media content item to scroll and the scroll element to move accordingly. More details regarding utilizing tilt gestures are described in U.S. patent application Ser. No. 13/846,131 filed Mar. 18, 2013, entitled "TILTING TO SCROLL", which is hereby incorporated herein by reference in its entirety.

Furthermore, the scroll element can be generated, by the scroll element module 208, based on a size of the viewable area included in the interface. In some implementations, the scroll element module 208 can generate the scroll element such that a size of the scroll element is proportional, within an allowable deviation, to the size of the viewable area. In some cases, the scroll element can be generated with a planar size that is proportional to a planar size of the viewable area. In some instances, one or more dimensions (e.g., width and/or height) of the scroll element can be respectively proportional to one or more dimensions of the viewable area.

Moreover, the scroll bar module 206 and the scroll element module 208 can operate in conjunction to cause a first ratio between the size of the scroll element and the size of the scroll bar to be representative of (i.e., to be proportional to, to correlate with, to be similar to, etc.) a second ratio between the size of the viewable area and the size of the panoramic media content item. For example, if a panoramic image has a width of 1,500 pixels and a height of 500 pixels while the viewable area has a width of 500 pixels and a height of 500 pixels, then the scroll bar module 206 can generate the scroll bar to have a width of 300 pixels and a height of 100 pixels (approximately) while the scroll element module 208 can generate the scroll element to have a width of 100 pixels and a height of 100 pixels (approximately). It should be understood that all examples herein are provided for illustrative purposes and that there can be many variations or other possibilities.

In some implementations, the viewable area module 204 can detect a change to the size of the viewable area. For instance, the interface can be presented via a web browser window of a user who is viewing or accessing the panoramic media content item. In this instance, the user can resize the web browser window. As such, the change in size to the web browser window can cause the change to the size of the viewable area. The viewable area module 204 can detect this change to the size of the viewable area. In response to the change to the size of the viewable area, the size of the scroll element can be modified by the scroll element module 208 and the size of the scroll bar can be modified by the scroll bar module 206, such that the first ratio between the size of the scroll element and the size of the scroll bar is representative of the second ratio between the size of the viewable area and the size of the panoramic media content item.

In some embodiments, subsequent to the viewable area module 204 detecting the change to the size of the viewable area but prior to modifying the scroll element, the scroll element module 208 can determine whether to modify the scroll element, based on the change to the size of the viewable area, to result in the scroll element having a modified scroll element size. Similarly, subsequent to the viewable area module 204 detecting the change to the size of the viewable area but prior to modifying the scroll bar, the scroll bar module 206 can determine whether to modify the scroll bar, based on the change to the size of the viewable area, to result in the scroll bar having a modified scroll bar size. In some cases, determining whether to modify the scroll element can include determining whether the modified scroll element size satisfies at least one of a scroll element minimum size requirement or a scroll element maximum size requirement. In some instances, determining whether to modify the scroll bar can include determining whether the modified scroll bar size satisfies at least one of a scroll bar minimum size requirement or a scroll bar maximum size requirement. For example, minimum and maximum widths and heights can be set for the scroll element, while minimum and maximum widths and heights can also be set for the scroll bar.

In some implementations, the scroll element module 208 can modify the scroll element, based on the change to the size of the viewable area, to result in the scroll element having the modified scroll element size when the modified scroll element size satisfies the at least one of the scroll element minimum size requirement or the scroll element maximum size requirement. The scroll bar module 206 can further modify the scroll bar, based on the change to the size of the viewable area, to result in the scroll bar having the modified scroll bar size when the modified scroll bar size satisfies the at least one of the scroll bar minimum size requirement or the scroll bar maximum size requirement. In some cases, the scroll element and the scroll bar can be modified with respect to a horizontal axis and are unmodified with respect to a vertical axis. For instance, if a minimum height requirement has been specified for the scroll bar (and the scroll element), and if a change to the size of the viewable area would cause the modified scroll bar size and the modified scroll element size to have heights less than the minimum height requirement, then the scroll bar and the scroll element can only be modified to minimum heights specified by the minimum height requirement.

Furthermore, in some embodiments, the scroll bar module 206 can present or display the scroll bar in accordance with a first visual appearance, whereas the scroll element module 208 can present or display the scroll element in accordance with a second visual appearance. In one example, the scroll bar can be presented in an at least partially transparent color and the scroll element can be presented with less transparency than the at least partially transparent color, or vice versa. In another example, the scroll bar can be presented in a first color while the scroll element can be presented in a second color.

Again, it should be appreciated that many variations are possible. For example, in some implementations, the interface module 202 can generate a second interface for presenting a full view of the panoramic media content item. In this example, the interface module 202 can provide at least one interactive element (e.g., a button, a switch, a toggle, etc.) for switching between the full view and the viewable area.

Figure 2B:
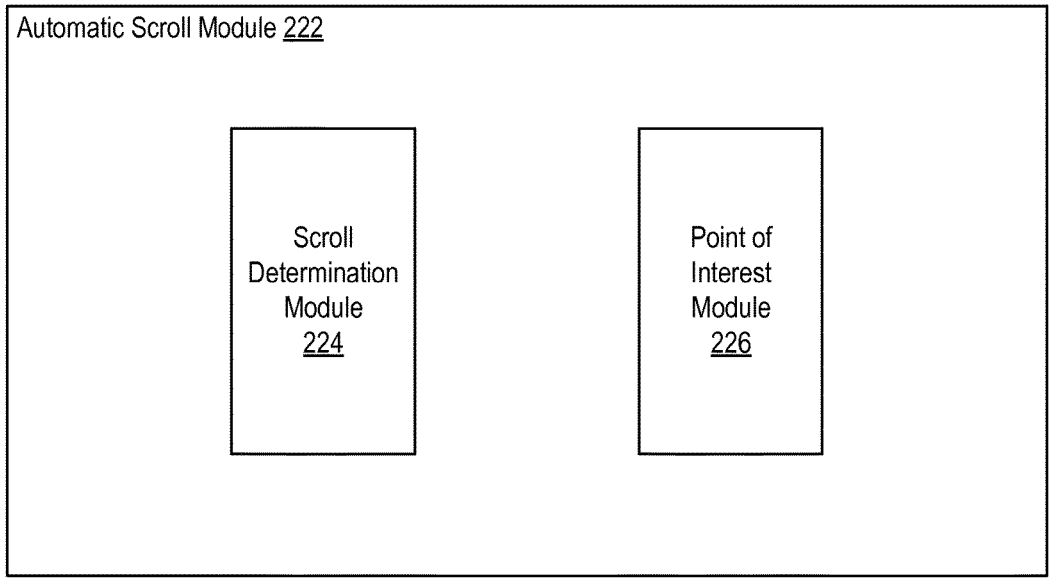
FIG. 2B illustrates an example automatic scroll module configured to facilitate providing interactivity for panoramic media content, according to an embodiment of the present disclosure.

FIG. 2B illustrates an example automatic scroll module 222 configured to facilitate providing interactivity for panoramic media content, according to an embodiment of the present disclosure. In some embodiments, the automatic scroll module 108 of FIG. 1 can be implemented as the example automatic scroll module 222. As shown in FIG. 2B, the example automatic scroll module 222 can include a scroll determination module 224 and a point of interest module 226.

As discussed previously, a panoramic media content item to be displayed can be acquired, such as by the panorama acquisition module 104 of FIG. 1. In some cases, the panoramic media content item can be displayed in a feed, such as in a newsfeed or a timeline of a social networking system. For instance, the panoramic media content item can be posted and displayed in conjunction with one or more other content items (e.g., images, videos, audio, text, other panoramas, etc.) in a social networking system user's newsfeed. Moreover, in some implementations, an interface (e.g., a feed interface) including a viewable area for displaying at least a first portion of the panoramic media content item in the feed can be generated, such as by the interface module 202 of FIG. 2A. For instance, the interface can be associated with a post within the social networking system, the feed can be associated with at least one of a particular newsfeed or a particular timeline (i.e., profile, wall, etc.) of the social networking system, and the post can be presented via the at least one of the particular newsfeed or the particular timeline of the social networking system.

However, in some cases, the entirety or the full size version of the panoramic media content item can be larger in planar size (e.g., wider and/or taller) than the viewable area. Since feeds can often times be associated with width-constrained environments, it can be undesirable for the viewable area included in the feed interface to attempt to display the entirety of the panoramic media content item, which can have significant width. Accordingly, an improved approach to displaying or presenting the panoramic media content item, such as that provided by the disclosed technology, can be beneficial.

In the example of FIG. 2B, the automatic scroll module 222 can be configured to facilitate automatically scrolling through at least the first portion of the panoramic media content item such that the viewable area displays, over time, at least a second portion of the panoramic media content item. For example, the automatic scroll module 222 can enable automatic scrolling of the entirety of the panoramic media content item (e.g., entirety of a full resolution/size version of the panorama, entirety of a reduced resolution/size version of the panorama, etc.), thereby causing the viewable area to display, over time, all portions of the panoramic media content item. In some instances, when multiple panoramic media content items are displayed in the feed, then the automatic scroll module 222 can cause each of the multiple panoramic media content items to be automatically scrolled. As such, a respective viewable area for each of the multiple panoramic media content items can display, over time, all portions of each respective panoramic media content item.

In addition, various embodiments can also attempt to conserve resources (e.g., processing power, battery life, etc.) and increase efficiency. In some embodiments, the scroll determination module 224 can specify or instruct that automatically scrolling through at least the first portion of the panoramic media content item is to be initiated when the viewable area is at least partially rendered on a display element, such as a display on a computing device of a user to whom the panoramic media content item is to be displayed. For instance, the scroll determination module 224 can determine or detect when the viewable area is at least partially rendered on the display element (e.g., display screen, touch screen, etc.), such as when a portion of the panoramic media content item in the viewable area is being rendered at the display element. In this instance, automatically scrolling can occur only when a portion of the panoramic media content item in the viewable area is being rendered at the display element.

The scroll determination module 224 can also specify or instruct that automatically scrolling through at least the first portion of the panoramic media content item is to be ceased when the viewable area is absent from being rendered on the display element, such as a screen of a computing system configured to display the panoramic media content item. For example, the scroll determination module 224 can determine or detect when no portion of the panoramic media content item is being rendered at the display element, and can instruct the automatic scrolling to cease (or not to start) when the panoramic media content item is not being rendered at the display element. Therefore, the computing system can operate more efficiently by conserving resources, such as processing power and battery life.

Moreover, as discussed previously, the automatic scroll module 222 can facilitate automatically scrolling through at least the first portion of the panoramic media content item such that the viewable area displays, over time, at least the second portion of the panoramic media content item. In some implementations, one or more user interactions performed with respect to at least the first portion or at least the second portion of the panoramic media content item can be detected, such as by the interface module 202. The one or more user interactions can, for instance, be associated with at least one of a mouse hover operation, a mouse click operation (e.g., clicking, dragging, etc.), and/or a touch gesture operation (e.g., tapping, pressing, dragging, etc.). The automatic scroll module 222 can cause the panoramic media content item to scroll, based on the one or more user interactions, such that the viewable area displays at least a third portion of the panoramic media content item. For example, automatic scrolling for a panorama can cease when the one or more user interactions occur with respect to the panorama. The panorama can instead be scrolled based on movements associated with the one or more user interactions (e.g., mouse hover movements, mouse click-and-drag movements, finger movements/swipes, etc.). In some instances, automatically scrolling through at least the third portion of the panoramic media content item can initiate (i.e., automatic scrolling can resume) when the one or more user interactions are detected to have ceased.

In some embodiments, detecting that the one or more user interactions have ceased can be performed by the interface module 202. A movement direction with which the one or more user interactions had most recently been associated can also be determined by the interface module 202. The automatic scroll module 222 can then automatically scroll through at least the third portion of the panoramic media content item in the movement direction. For instance, if the panoramic media content item had been swiped in a leftward direction, then after being swiped, the panoramic media content item can be automatically scrolled in the leftward direction. It is contemplated that many variations are possible.

In some implementations, the panoramic media content item can include one or more points of interest. The point of interest module 226 can be configured to detect such one or more points of interest in the panoramic media content item. In some cases, at least the second portion of the panoramic media content item can depict, display, or include the one or more points of interest. A speed for automatically scrolling through at least the second portion of the panoramic media content item can be decreased, such as by the point of interest module 226. Accordingly, a user viewing the panoramic media content item can have more time and/or a more focused view with respect to the one or more points of interest depicted, displayed, or included in at least the second portion.

The one or more points of interests can, for instance, be associated with a tagged object, a detected object, and/or a recognized object. Examples of the tagged object can include, but are not limited to, a tagged location (e.g., a tagged landmark) and/or a tagged entity (e.g., a tagged user, a tagged topic, a tagged subject matter). An example of the detected object can include, but is not limited to, a detected face object identified using a face detection process (e.g., a detected face, a detected facial feature). Examples of the recognized object can include, but are not limited to, an object identified using an image classification process (e.g., a classified/categorized concept, a recognized subject matter, a recognized item) or a recognized face object identified using a face recognition process (e.g., a recognized user). As discussed above, it is contemplated that all examples herein are provided for illustrative purposes and there can be many variations or other possibilities for the disclosed technology.

Figure 2C:
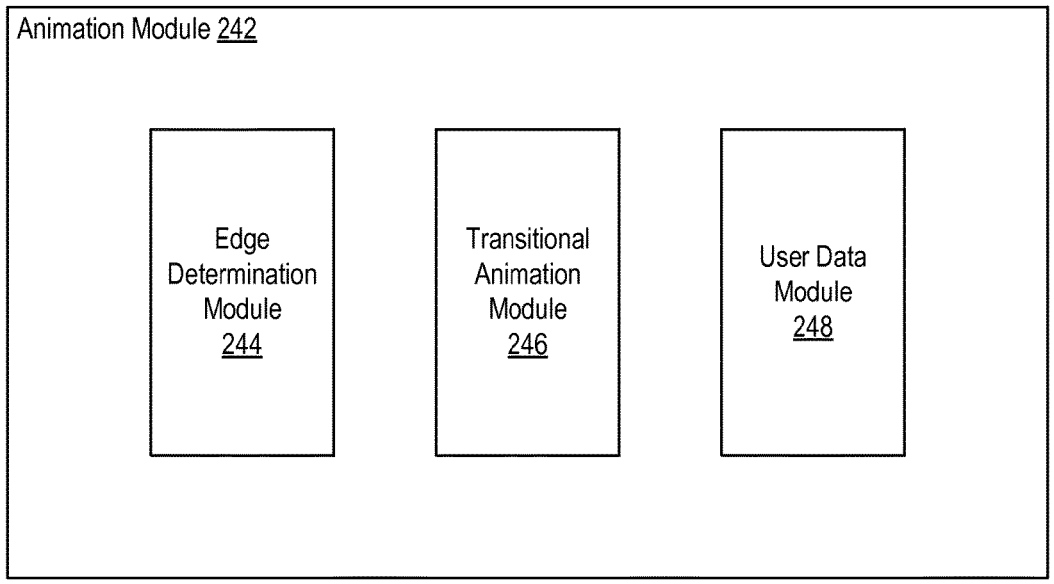
FIG. 2C illustrates an example animation module configured to facilitate providing interactivity for panoramic media content, according to an embodiment of the present disclosure.

FIG. 2C illustrates an example animation module 242 configured to facilitate providing interactivity for panoramic media content, according to an embodiment of the present disclosure. In some embodiments, the animation module 110 of FIG. 1 can be implemented as the example animation module 242. As shown in FIG. 2C, the example animation module 242 can include an edge determination module 244, a transitional animation module 246, and a user data module 248.

As discussed previously, a panoramic media content item to be displayed can be acquired, such as by the panorama acquisition module 104 of FIG. 1. An interface including a viewable area for displaying at least a first portion of the panoramic media content item can be generated, such as by the interface module 202 of FIG. 2A. The panoramic media content item can be automatically scrolled, such as by the automatic scroll module 222 of FIG. 2B, in a first direction such that the viewable area displays, over time, at least a second portion of the panoramic media content item. The animation module 242 can be configured to facilitate determining that at least one of a leftmost edge or a rightmost edge of the panoramic media content item is displayed via the viewable area and can also be configured to facilitate performing a transitional animation associated with the at least one of the leftmost edge or the rightmost edge of the panoramic media content item, as discussed above.

In some embodiments, the animation module 242 can utilize the edge determination module 244 to determine that at least one of the leftmost edge or the rightmost edge of the panoramic media content item is displayed via the viewable area. For instance, while the panoramic media content item is being automatically scrolled, the determination module 246 can determine or detect when the panoramic media content item has been scrolled to reveal one of its edges in the viewable area.

In some implementations, the animation module 242 can utilize the transitional animation module 246 to perform the transitional animation associated with the at least one of the leftmost edge or the rightmost edge of the panoramic media content item. In some cases, the transitional animation includes automatically scrolling the panoramic media content item in a second direction different from the first direction. For instance, the first direction and the second direction can be along a horizontal axis, and the second direction can be opposite to the first direction. Many variations are possible.

In one example, when the edge determination module 244 determines that the panoramic media content item has been scrolled leftward to reveal the item's rightmost edge in the viewable area, the transitional animation module 246 can cause the automatic scrolling of the panoramic media content item to perform a bounce-back animation towards the right (and continue automatically scrolling towards the right). Similarly, in this example, when the edge determination module 244 determines that the panoramic media content item has been scrolled rightward to reveal the item's leftmost edge in the viewable area, the transitional animation module 246 can cause the automatic scrolling of the panoramic media content item to perform a bounce-back animation towards the left (and continue automatically scrolling towards the left).

Furthermore, in some embodiments, the transitional animation can include automatically scrolling the panoramic media content item in the first direction (e.g., continue scrolling in a single direction instead of a bounce-back animation) such that the leftmost edge and the rightmost edge appear to be connected together. This transitional animation can be continuously repeatable. For instance, the transitional animation module 244 can cause opposite edges of a panorama to appear to be connected together. The panorama can appear to be wrapped around a virtual cylinder such that the leftmost and rightmost edges of the panorama are connected. Accordingly, the transitional animation module 244 can cause the panorama to be automatically scrolled in a virtual loop towards a single direction. Again, it should be appreciated that many variations are possible.

Furthermore, in some embodiments, the user data module 248 can be configured to facilitate acquiring information associated with a user (e.g., historical usage data about the user, usage patterns, user properties, etc.) to whom the panoramic media content item is to be displayed. The user data module 248 can analyze the information to identify one or more content consumption properties associated with the user. In some cases, the one or more content consumption properties can be indicative of a pace at which the user consumes content (e.g., a reading speed/pace of the user, a manual scrolling speed/pace of the user, etc.). For instance, based on the information, the user data module 248 can analyze how fast the user scrolls through text, images, videos, and/or other content in order to estimate the pace at which the user consumes content. Based on the one or more content consumption properties (e.g., the pace at which the user consumes content), the animation module 242 can adjust at least one of a speed or a timing factor associated with automatically scrolling the panoramic media content item, such as by slowing down or speeding up the automatic scrolling.

Moreover, in some embodiments, the panorama acquisition module 104 can acquire size information associated with the panoramic media content item. Based on the size information, the animation module 242 can adjust at least one of the speed or the timing factor associated with automatically scrolling the panoramic media content item. In one example, if a panorama is larger (e.g., wider), then the animation module 242 can cause the automatically scrolling to be faster. In another example, if the panorama is smaller (e.g., narrower), then the animation module 242 can cause the automatically scrolling to be slower. It should be understood that many variations are possible.

Figure 3A:
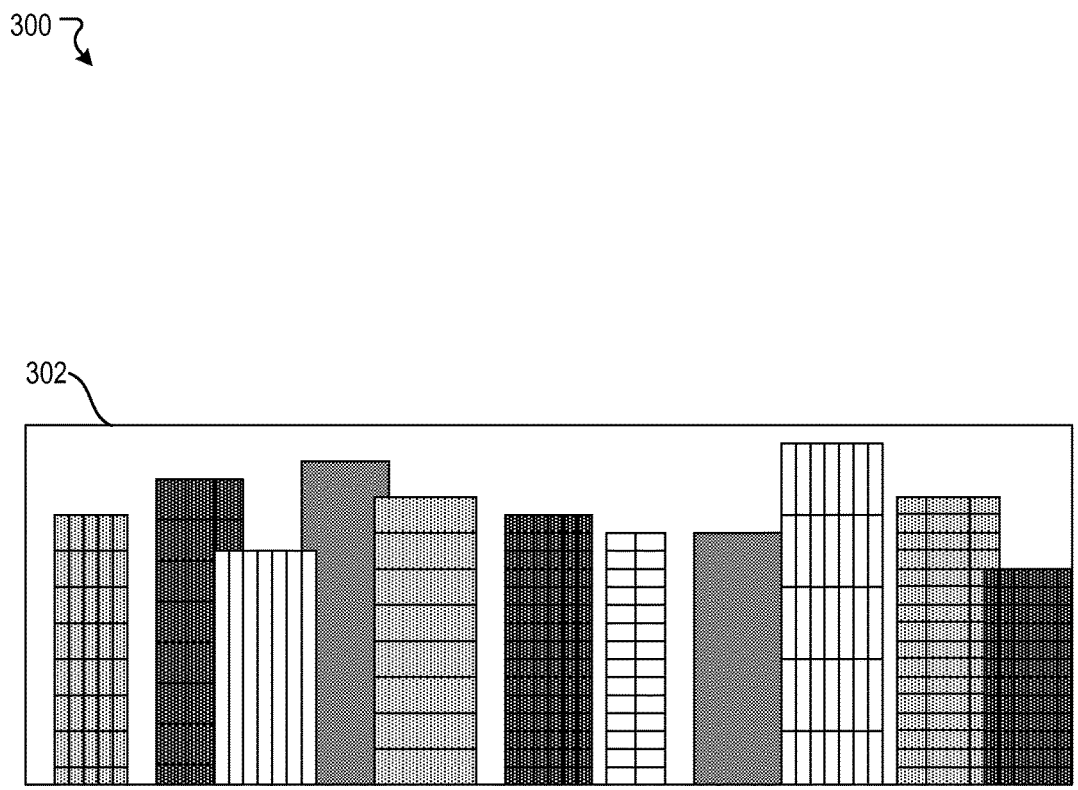
FIG. 3A illustrates an example scenario associated with providing interactivity for panoramic media content, according to an embodiment of the present disclosure.

FIG. 3A illustrates an example scenario 300 associated with providing interactivity for panoramic media content, according to an embodiment of the present disclosure. The example scenario 300 illustrates an example panoramic media content item 302 (i.e., a panorama). The example panoramic media content item 302 can, for instance, include a panoramic image, a panoramic animated image (i.e., a panoramic GIF image), or a panoramic video, etc. Various embodiments of the present disclosure can provide interactivity and/or other features for the example panoramic media item 302.

Figure 3B:
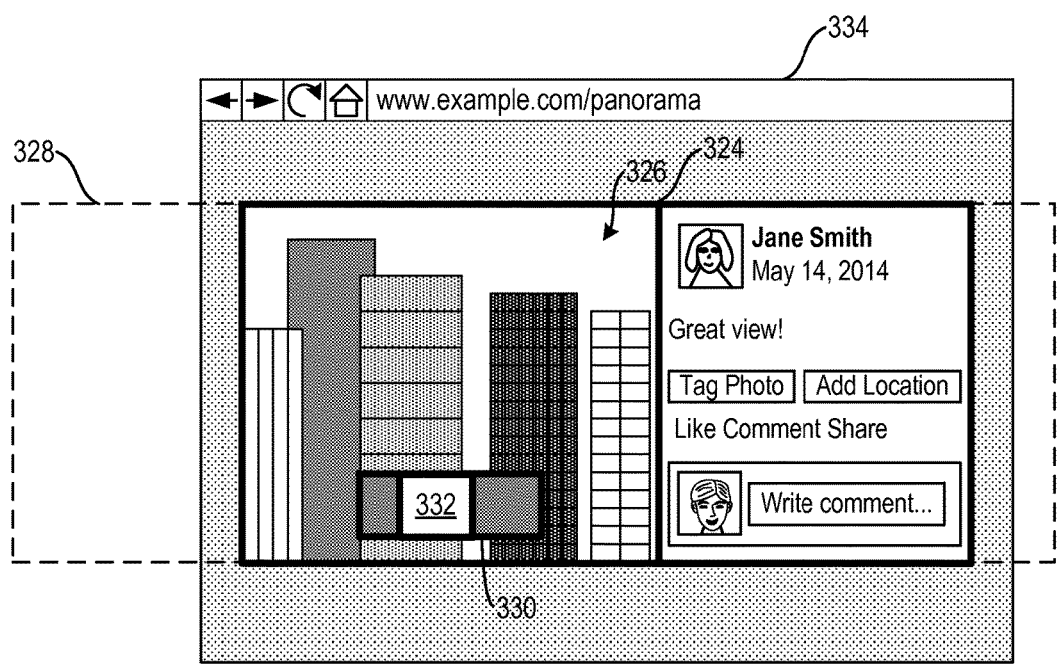
FIG. 3B illustrates an example scenario associated with providing interactivity for panoramic media content, according to an embodiment of the present disclosure.

FIG. 3B illustrates an example scenario 320 associated with providing interactivity for panoramic media content, according to an embodiment of the present disclosure. The example scenario 320 illustrates an example interface 324 generated to include a viewable area 326 for displaying at least a portion of a panoramic media content item (e.g., the panoramic media content item 302 in FIG. 3A). In some cases, the interface 324 of FIG. 3B can be provided via a web browser 334 or other content exploring window. In this example scenario 320, the size of the entirety or full version of the panoramic media content item can be represented by a dashed boundary 328. As shown in FIG. 3B, one or more portions of the entirety or full version of the panoramic media content item can extend outside the viewable area 326 and are thus not displayed in the viewable area 326.

In some embodiments, a scroll bar 330 can be generated, within the interface 324, for scrolling the panoramic media content item. As discussed above, the scroll bar 330 can be generated based on a size of the panoramic media content item (represented by boundary 328). For instance, a size of the scroll bar 330 can generated to be proportional, within an allowable deviation, to the size of the panoramic media content item. Moreover, in some implementations, a scroll element 332 can be generated, within the scroll bar 330, to be movable based on one or more user interactions to scroll the panoramic media content item. The scroll element 332 can be generated based on a size of the viewable area 326 included in the interface 324. For example, a size of the scroll element 332 can be generated to be proportional, within the allowable deviation, to the size of the viewable area 326. There can be many variations or other possibilities.

Figure 3C:
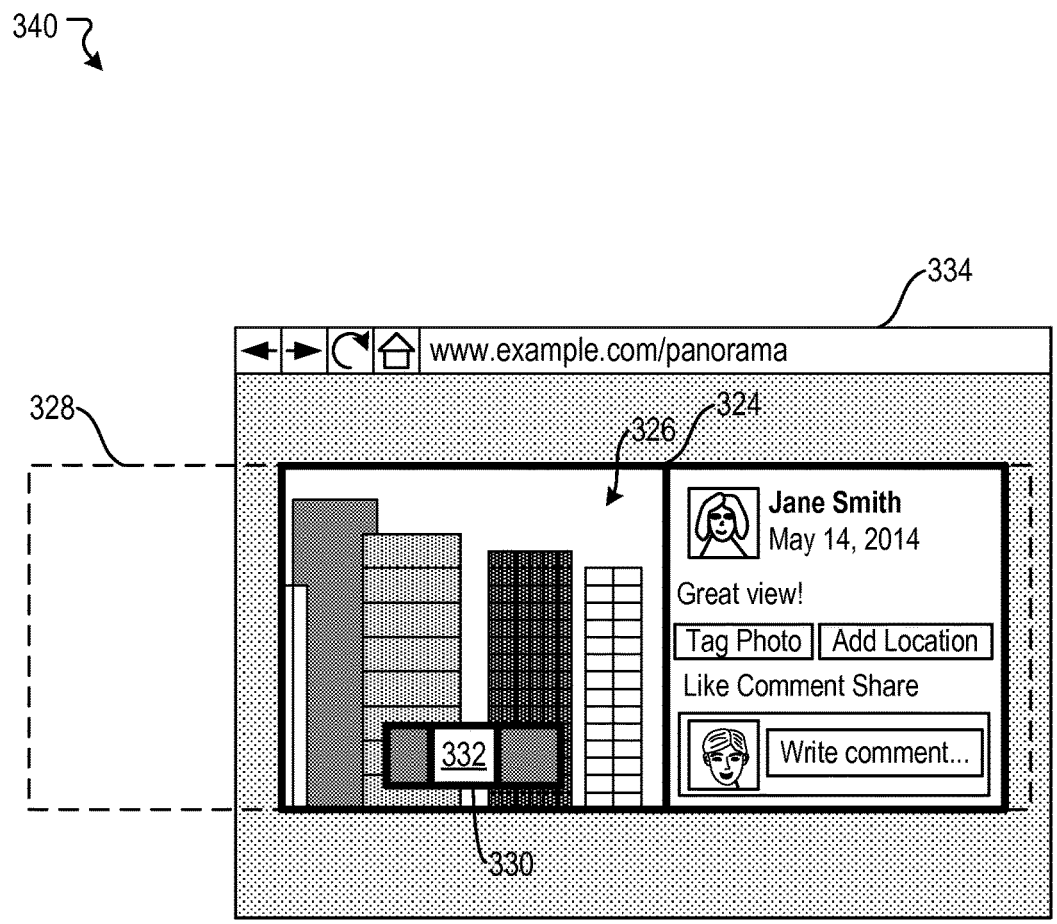
FIG. 3C illustrates an example scenario associated with providing interactivity for panoramic media content, according to an embodiment of the present disclosure.

FIG. 3C illustrates an example scenario 340 associated with providing interactivity for panoramic media content, according to an embodiment of the present disclosure. The example scenario 340 can illustrate the interface 324 in FIG. 3B. However, in the example scenario 340 of FIG. 3C, the web browser window 334 has been resized, which can cause a change to the size of the viewable area 326. The disclosed technology can detect the change to the size of the viewable area 326. In response to the change to the size of the viewable area 326, the disclosed technology can modify the size of the scroll element 332 and the size of the scroll bar 330 such that a first ratio between the size of the scroll element 332 and the size of the scroll bar 330 is representative of (e.g., equivalent to, correlative of, similar to, etc.) a second ratio between the size of the viewable area 326 and the size of the panoramic media content item (represented by the boundary 328). Again, many variations are possible.

Figure 4A:
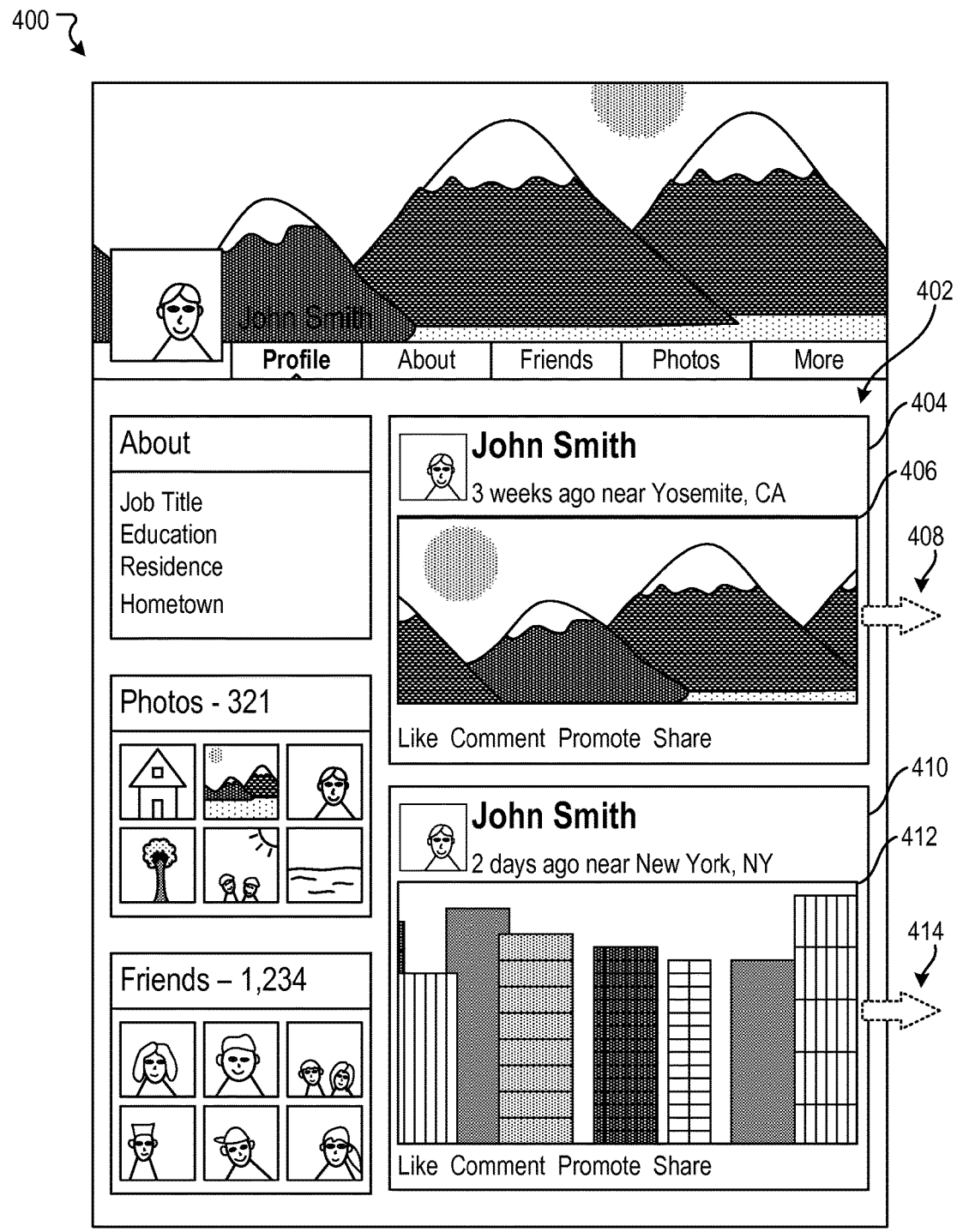
FIG. 4A illustrates an example scenario associated with providing interactivity for panoramic media content, according to an embodiment of the present disclosure.

FIG. 4A illustrates an example scenario 400 associated with providing interactivity for panoramic media content, according to an embodiment of the present disclosure. The example scenario 400 illustrates an example feed 402, such as a newsfeed or a timeline within a social networking system. In this example, the feed 402 can present a first feed interface 404 including a first viewable area 406 for displaying at least a portion of a first panorama. Due to the width constraint of the feed 402, the entirety or full version of the first panorama extends beyond the first viewable area 406. As such, the first panorama can be automatically scrolled (as represented by arrow 408) to display its entirety over time.

As shown, the feed 402 can also present a second feed interface 410 including a second viewable area 412 for displaying at least a portion of a second panorama. Similarly, due to the width constraint of the feed 402, the entirety or full version of the second panorama extends beyond the second viewable area 412. Thus, the second panorama can be automatically scrolled (as represented by arrow 414) to display its entirety over time.

Figure 4B:
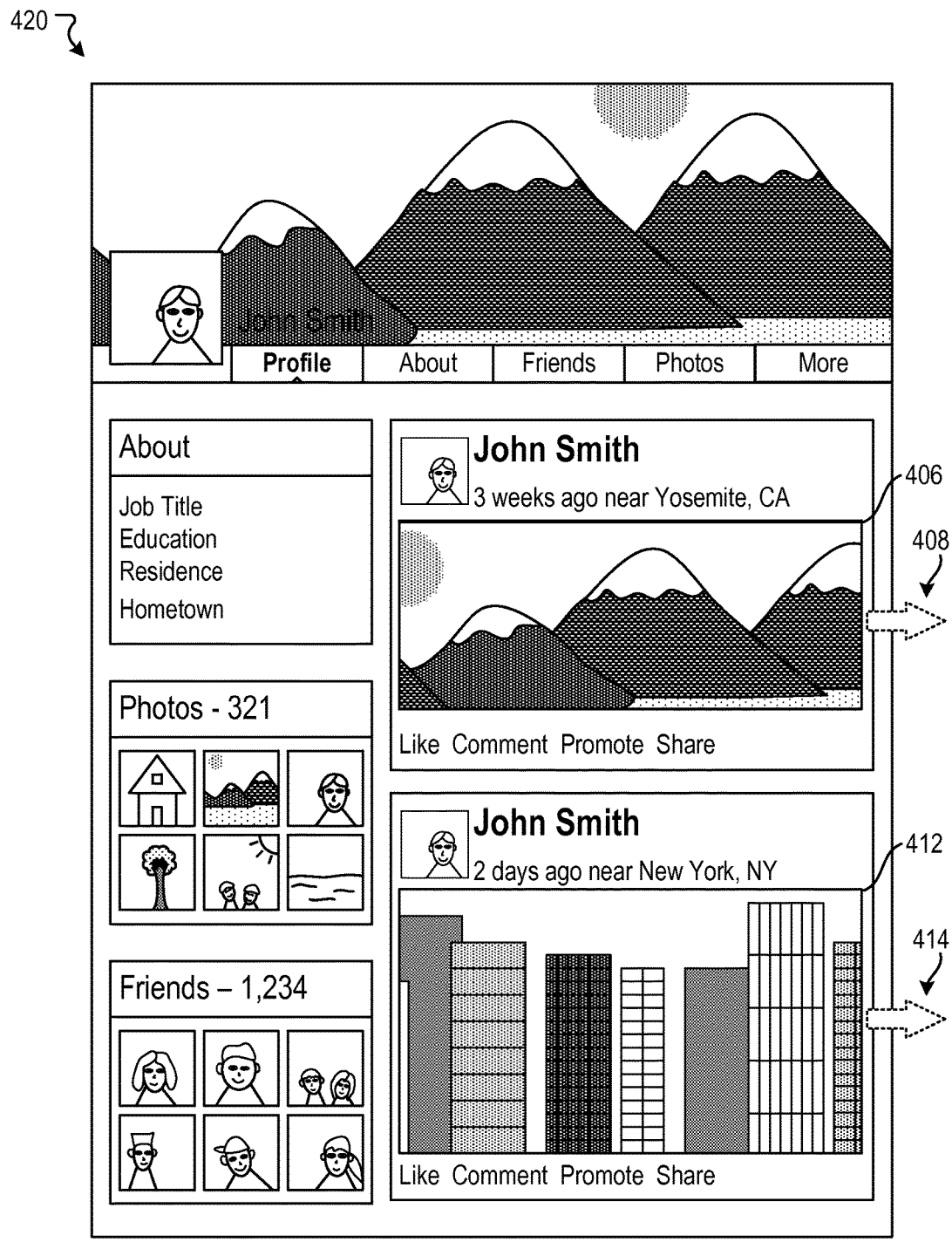
FIG. 4B illustrates an example scenario associated with providing interactivity for panoramic media content, according to an embodiment of the present disclosure.

FIG. 4B illustrates an example scenario 420 associated with providing interactivity for panoramic media content, according to an embodiment of the present disclosure. The example scenario 420 can correspond to the example scenario 400 in FIG. 4A. However, in the example scenario 420 of FIG. 4B, the automatic scrolling 408 of the first panorama has continued further such that one or more other portions of the first panorama are revealed or displayed in the first viewable area 406. Similarly, the automatic scrolling 414 of the second panorama has continued further such that one or more other portions of the second panorama are revealed or displayed in the second viewable area 412. Again, many variations are possible.

Figure 5A:
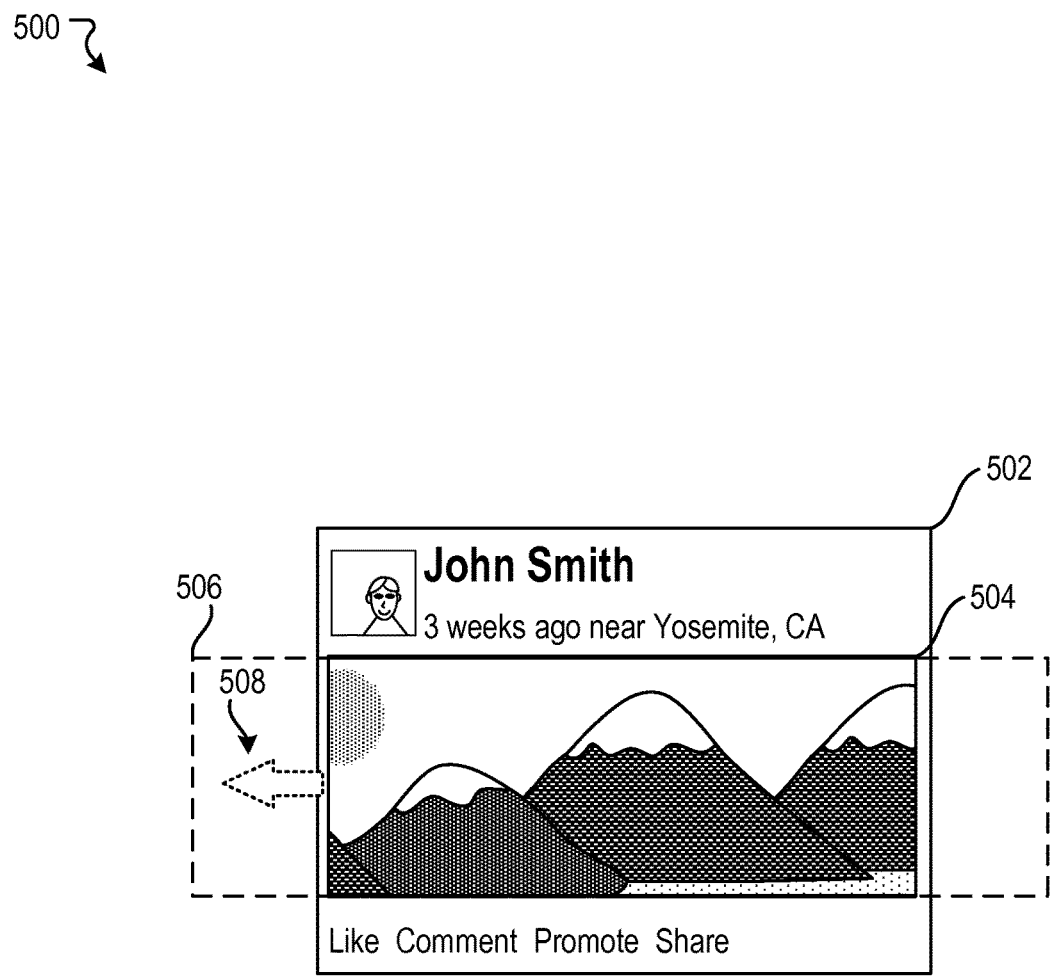
FIG. 5A illustrates an example scenario associated with providing interactivity for panoramic media content, according to an embodiment of the present disclosure.

FIG. 5A illustrates an example scenario 500 associated with providing interactivity for panoramic media content, according to an embodiment of the present disclosure. The example scenario 500 illustrates an example interface 502 generated to include a viewable area 504 for displaying at least a portion of a panorama. The size of the entirety or full version size of the panorama is represented via the boundary line 506. In this example scenario 500, the panorama is being automatically scrolled 508 towards the left.

Figure 5B:
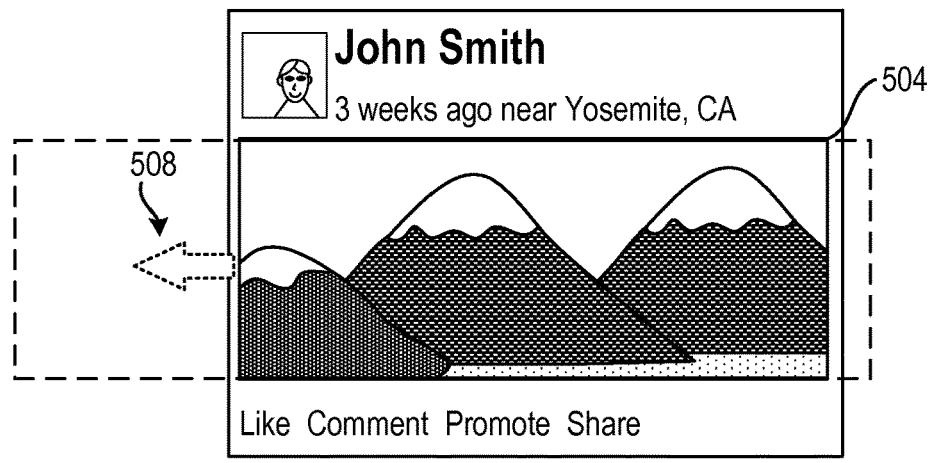
FIG. 5B illustrates an example scenario associated with providing interactivity for panoramic media content, according to an embodiment of the present disclosure.

FIG. 5B illustrates an example scenario 520 associated with providing interactivity for panoramic media content, according to an embodiment of the present disclosure. The example scenario 520 can correspond to the example scenario 500 in FIG. 5A. However, in the example scenario 520 of FIG. 5B, the automatic scrolling 508 of the panorama has continued further towards the left such that one or more other portions of the first panorama are revealed or displayed in the viewable area 504.

Figure 5C:
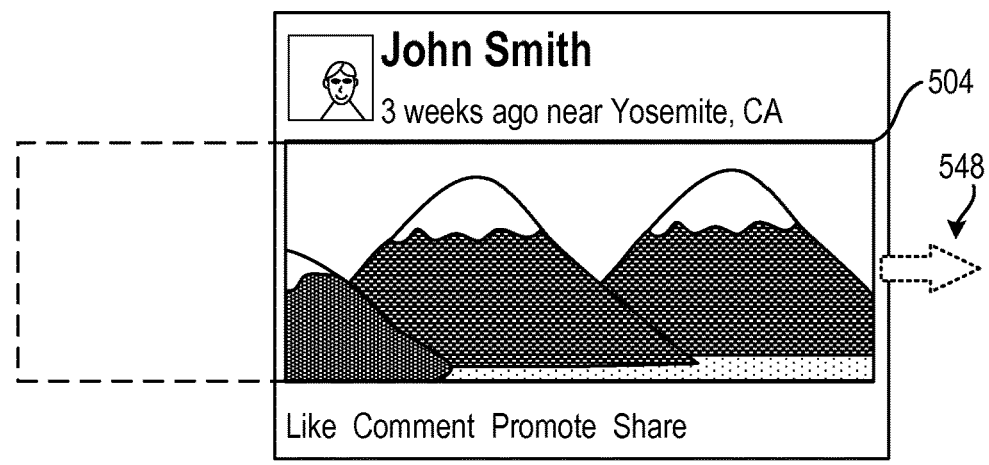
FIG. 5C illustrates an example scenario associated with providing interactivity for panoramic media content, according to an embodiment of the present disclosure.

FIG. 5C illustrates an example scenario 540 associated with providing interactivity for panoramic media content, according to an embodiment of the present disclosure. The example scenario 540 can correspond to the example scenario 520 in FIG. 5B. However, in the example scenario 540 of FIG. 5C, the automatic scrolling 508 has scrolled the panorama all the way to the left, thereby revealing its rightmost edge in the viewable area 504. In this example scenario 540, the disclosed technology can perform a transitional animation for the panorama and cause the panorama to bounce-back and automatically scroll 548 towards the right.

Figure 5D:
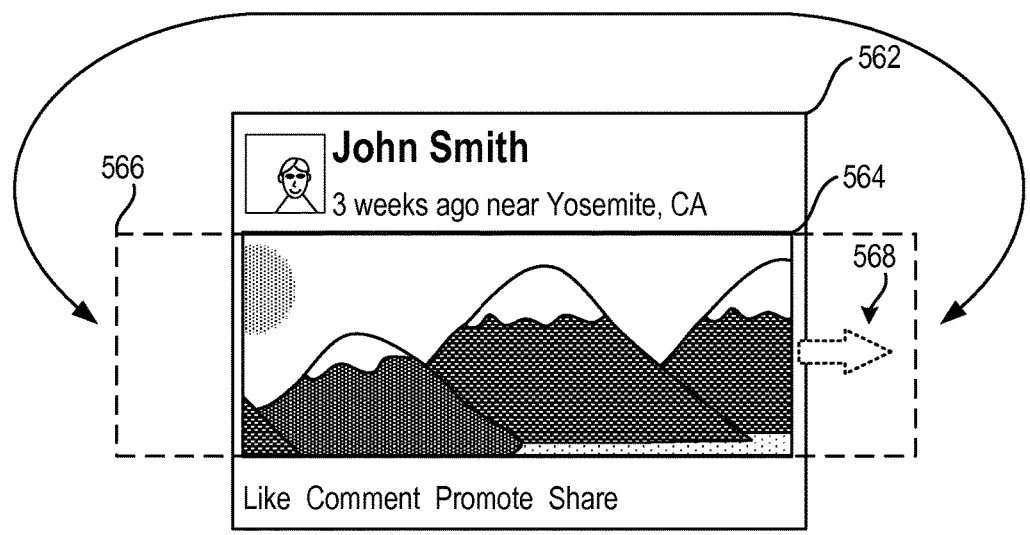
FIG. 5D illustrates an example scenario associated with providing interactivity for panoramic media content, according to an embodiment of the present disclosure.

FIG. 5D illustrates an example scenario 560 associated with providing interactivity for panoramic media content, according to an embodiment of the present disclosure. The example scenario 560 illustrates an example interface 562 generated to include a viewable area 564 for displaying at least a portion of a panorama. The size of the entirety or full version size of the panorama is represented via the boundary line 566. In this example scenario 500, the panorama is being automatically scrolled 568 towards the right.

In some embodiments, a transitional animation can automatically scroll the panorama in a single direction 568 such that the leftmost edge and the rightmost edge appear to be connected together. This transitional animation can be continuously repeatable. For instance, the disclosed technology can cause opposite edges of the panorama to appear to be connected together. The panorama can appear to be wrapped around a virtual cylinder such that the leftmost and rightmost edges of the panorama are joined. Accordingly, the panorama can be automatically scrolled in a virtual loop towards the single direction 568 (or towards an opposite direction). As discussed previously, it should be appreciated that many variations are possible.

Figure 6A:
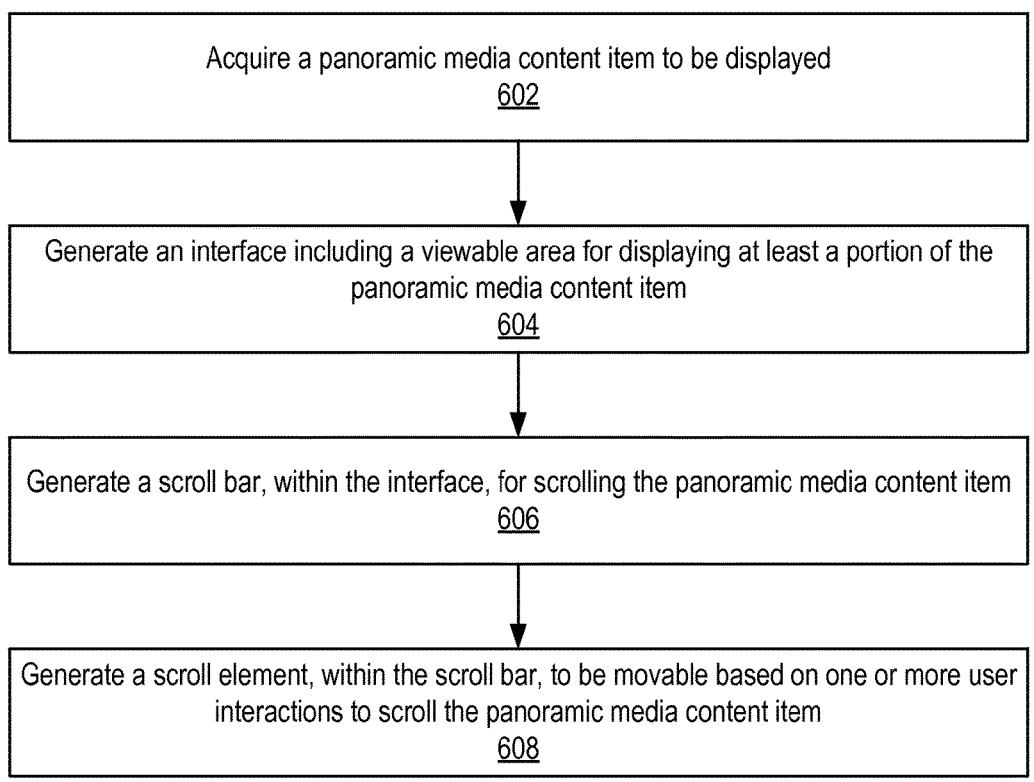
FIG. 6A illustrates an example method associated with providing interactivity for panoramic media content, according to an embodiment of the present disclosure.

FIG. 6A illustrates an example method 600 associated with providing interactivity for panoramic media content, according to an embodiment of the present disclosure. It should be appreciated that there can be additional, fewer, or alternative steps performed in similar or alternative orders, or in parallel, within the scope of the various embodiments unless otherwise stated.

At block 602, the example method 600 can acquire a panoramic media content item to be displayed. At block 604, the example method 600 can generate an interface including a viewable area for displaying at least a portion of the panoramic media content item. At block 606, the example method 600 can generate a scroll bar, within the interface, for scrolling the panoramic media content item. The scroll bar can be generated based on a size of the panoramic media content item. At block 608, the example method 600 can generate a scroll element, within the scroll bar, to be movable based on one or more user interactions to scroll the panoramic media content item. The scroll element can be generated based on a size of the viewable area included in the interface.

Figure 6B:
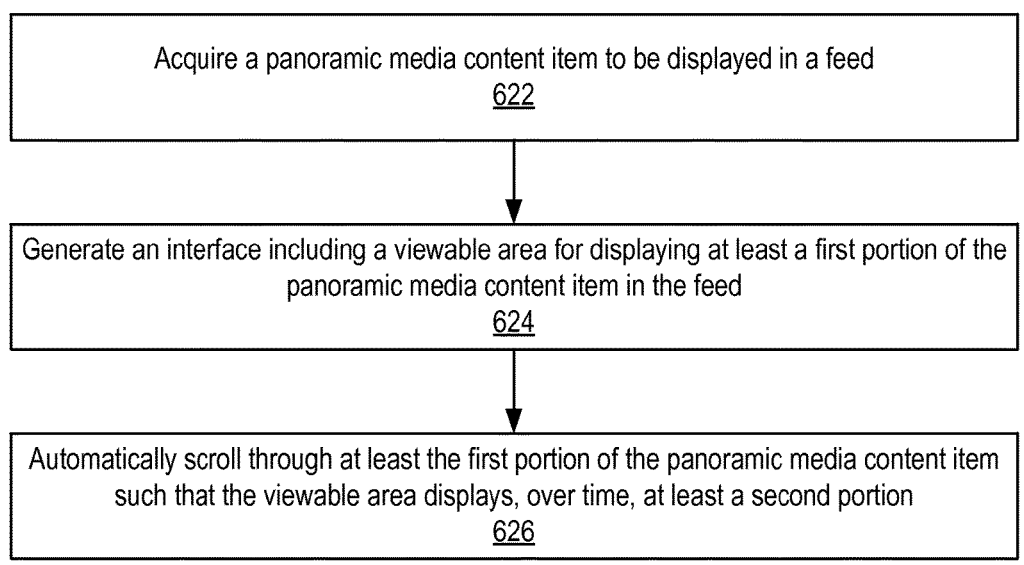
FIG. 6B illustrates an example method associated with providing interactivity for panoramic media content, according to an embodiment of the present disclosure.

FIG. 6B illustrates an example method 620 associated with providing interactivity for panoramic media content, according to an embodiment of the present disclosure. As discussed above, it should be understood that there can be additional, fewer, or alternative steps performed in similar or alternative orders, or in parallel, within the scope of the various embodiments unless otherwise stated.

At block 622, the example method 620 can acquire a panoramic media content item to be displayed in a feed. At block 624, the example method 620 can generate an interface including a viewable area for displaying at least a first portion of the panoramic media content item in the feed. At block 626, the example method 620 can automatically scroll through at least the first portion of the panoramic media content item such that the viewable area displays, over time, at least a second portion of the panoramic media content item.

Figure 6C:
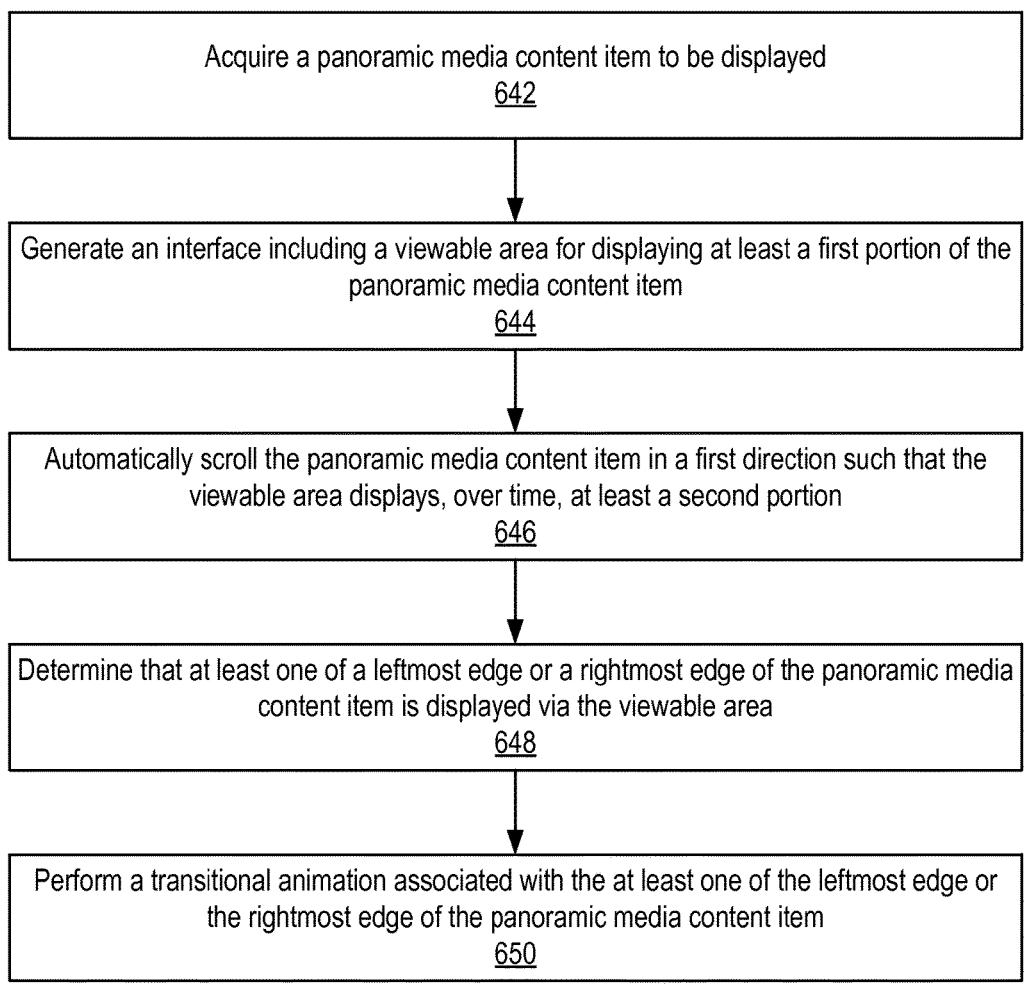
FIG. 6C illustrates an example method associated with providing interactivity for panoramic media content, according to an embodiment of the present disclosure.

FIG. 6C illustrates an example method 640 associated with providing interactivity for panoramic media content, according to an embodiment of the present disclosure. Again, it should be appreciated that there can be additional, fewer, or alternative steps performed in similar or alternative orders, or in parallel, within the scope of the various embodiments unless otherwise stated.

At block 642, the example method 640 can acquire a panoramic media content item to be displayed. At block 644, the example method 640 can generate an interface including a viewable area for displaying at least a first portion of the panoramic media content item. At block 646, the example method 640 can automatically scroll the panoramic media content item in a first direction such that the viewable area displays, over time, at least a second portion of the panoramic media content item. At block 648, the example method 640 can determine that at least one of a leftmost edge or a rightmost edge of the panoramic media content item is displayed via the viewable area. At block 650, the example method 640 can perform a transitional animation associated with the at least one of the leftmost edge or the rightmost edge of the panoramic media content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
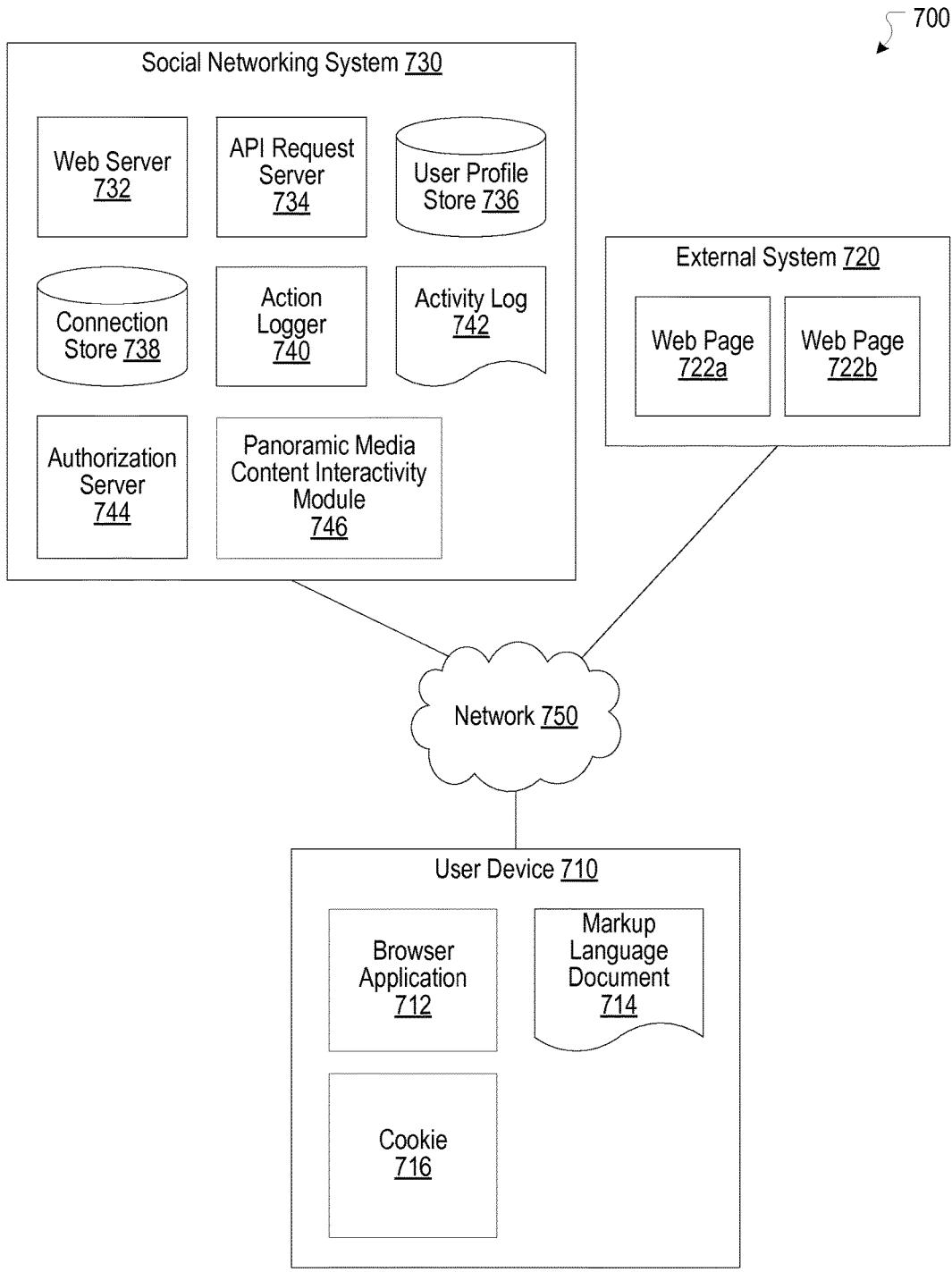
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a panoramic media content interactivity module 746. The panoramic media content interactivity module 746 can, for example, be implemented as the panoramic media content interactivity module 102 of FIG. 1. As discussed previously, it should be appreciated that there can be many variations or other possibilities. For example, in some instances, the panoramic media content interactivity module 746 (or at least a portion thereof) can be included in the user device 710. Other features of the panoramic media content interactivity module 746 are discussed herein in connection with the panoramic media content interactivity module 102.

Hardware Implementation

Figure 8:
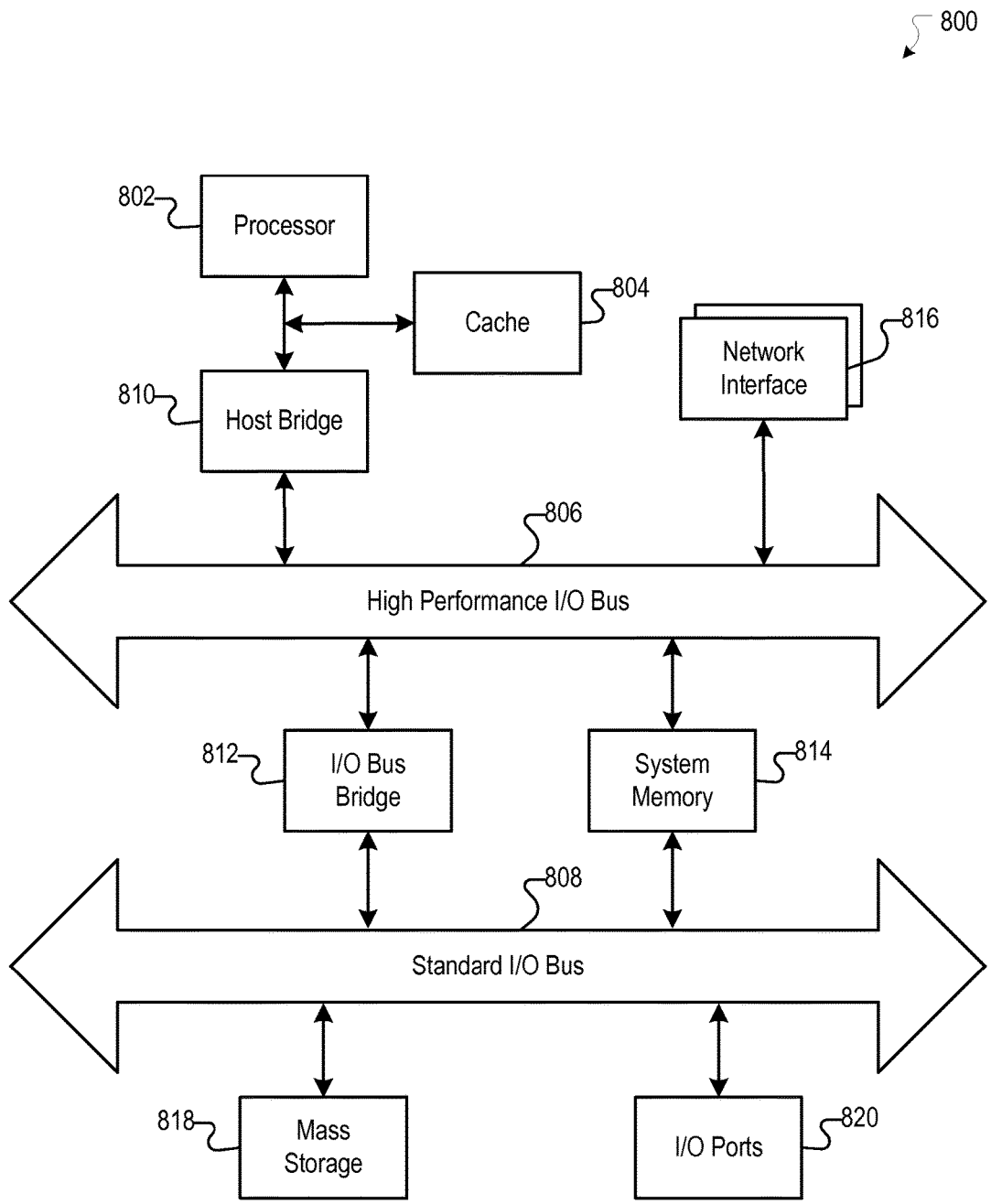
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    acquiring, by a computing system, a panoramic still image to be displayed in a feed;
    generating, by the computing system, an interface including a viewable area displaying a first portion of the panoramic still image in the feed, wherein the panoramic still image includes a second portion;
    acquiring, by the computing system, size information associated with the panoramic still image;
    adjusting, by the computing system, an automatic scroll speed for the panoramic still image based on the size information, wherein a larger panoramic still image causes the automatic scroll speed to be faster than a smaller panoramic still image;
    automatically, by the computing system, scrolling through the panoramic still image from the first portion to the second portion based on the automatic scroll speed such that the viewable area displays, over time, the second portion;
    ceasing, by the computing system, automatic scrolling of the panoramic still image based on detection of one or more user interactions associated with manual scrolling of the panoramic still image; and
    after ceasing automatic scrolling of the panoramic still image, scrolling, by the computing system, the panoramic still image in response to the one or more user interactions associated with manual scrolling of the panoramic still image.

2. The computer-implemented method of claim 1, wherein
    the one or more user interactions are performed with respect to the first portion or the second portion of the panoramic still image, and
    the method further comprises:
        scrolling the panoramic still image, based on the one or more user interactions, such that the viewable area displays a third portion of the panoramic still image; and automatically scrolling through the third portion of the panoramic still image when the one or more user interactions have ceased.

3. The computer-implemented method of claim 2, wherein the one or more user interactions are associated with at least one of: a mouse hover operation, a mouse click operation, or a touch gesture operation.

4. The computer-implemented method of claim 2, wherein the automatically scrolling through the third portion of the panoramic still image when the one or more user interactions have ceased comprises:
 detecting that the one or more user interactions have ceased;
 determining a movement direction with which the one or more user interactions had most recently been associated; and
 automatically scrolling through the third portion of the panoramic still image in the movement direction.

5. The computer-implemented method of claim 1, wherein the second portion depicts one or more points of interest, and the one or more points of interest are associated with at least one of a tagged object, a detected object, or a recognized object.

6. The computer-implemented method of claim 5, wherein the tagged object includes at least one of a tagged location or a tagged entity, wherein the detected object includes a detected face object identified using a face detection process, and wherein the recognized object includes at least one of an object identified using an image classification process or a recognized face object identified using a face recognition process.

7. The computer-implemented method of claim 1, wherein the interface is associated with a post within a social networking system, wherein the feed is associated with at least one of a newsfeed or a timeline of the social networking system, and wherein the post is presented via the at least one of the newsfeed or the timeline of the social networking system.

8. A system comprising:
 at least one processor; and
 a memory storing instructions that, when executed by the at least one processor, cause the system to perform a method comprising:
 acquiring a panoramic still image to be displayed in a feed;
 generating an interface including a viewable area displaying a first portion of the panoramic still image in the feed, wherein the panoramic still image includes a second portion;
 acquiring size information associated with the panoramic still image;
 adjusting an automatic scroll speed for the panoramic still image based on the size information, wherein a larger panoramic still image causes the automatic scroll speed to be faster than a smaller panoramic still image;
 automatically scrolling through the panoramic still image from the first portion to the second portion based on the automatic scroll speed such that the viewable area displays, over time, the second portion;
 ceasing automatic scrolling of the panoramic still image based on detection of one or more user interactions associated with manual scrolling of the panoramic still image; and
 after ceasing automatic scrolling of the panoramic still image, scrolling the panoramic still image in response to the one or more user interactions associated with manual scrolling of the panoramic still image.

9. The system of claim 8, wherein
 the one or more user interactions are performed with respect to the first portion or the second portion of the panoramic still image, and
 the instructions cause the system to further perform:
 scrolling the panoramic still image, based on the one or more user interactions, such that the viewable area displays a third portion of the panoramic still image; and
 automatically scrolling through the third portion of the panoramic still image when the one or more user interactions have ceased.

10. The system of claim 9, wherein the automatically scrolling through the third portion of the panoramic still image when the one or more user interactions have ceased comprises:
 detecting that the one or more user interactions have ceased;
 determining a movement direction with which the one or more user interactions had most recently been associated; and
 automatically scrolling through the third portion of the panoramic still image in the movement direction.

11. The system of claim 8, wherein the panoramic still image includes one or more points of interest.

12. A non-transitory computer-readable storage medium including instructions that, when executed by at least one processor of a computing system, cause the computing system to perform a method comprising:
 acquiring a panoramic still image to be displayed in a feed;
 generating an interface including a viewable area displaying a first portion of the panoramic still image in the feed, wherein the panoramic still image includes a second portion;
 acquiring size information associated with the panoramic still image;
 adjusting an automatic scroll speed for the panoramic still image based on the size information, wherein a larger panoramic still image causes the automatic scroll speed to be faster than a smaller panoramic still image;
 automatically scrolling through the panoramic still image from the first portion to the second portion based on the automatic scroll speed such that the viewable area displays, over time, the second portion;
 ceasing automatic scrolling of the panoramic still image based on detection of one or more user interactions associated with manual scrolling of the panoramic still image; and
 after ceasing automatic scrolling of the panoramic still image, scrolling the panoramic still image in response to the one or more user interactions associated with manual scrolling of the panoramic still image.

13. The non-transitory computer-readable storage medium of claim 12, wherein
 the one or more user interactions are performed with respect to the first portion or the second portion of the panoramic still image, and
 the instructions cause the computing system to further perform:
 scrolling the panoramic still image, based on the one or more user interactions, such that the viewable area displays a third portion of the panoramic still image; and
 automatically scrolling through the third portion of the panoramic still image when the one or more user interactions have ceased.

14. The non-transitory computer-readable storage medium of claim 13, wherein the automatically scrolling through the third portion of the panoramic still image when the one or more user interactions have ceased comprises:
- detecting that the one or more user interactions have ceased;
- determining a movement direction with which the one or more user interactions had most recently been associated; and
- automatically scrolling through the third portion of the panoramic still image in the movement direction.

15. The non-transitory computer-readable storage medium of claim 12, wherein the panoramic still image includes one or more points of interest.

16. The system of claim 9, wherein the one or more user interactions are associated with at least one of: a mouse hover operation, a mouse click operation, or a touch gesture operation.

17. The system of claim 8, wherein the second portion depicts one or more points of interest, and the one or more points of interest are associated with at least one of a tagged object, a detected object, or a recognized object.

18. The system of claim 17, wherein the tagged object includes at least one of a tagged location or a tagged entity, wherein the detected object includes a detected face object identified using a face detection process, and wherein the recognized object includes at least one of an object identified using an image classification process or a recognized face object identified using a face recognition process.

19. The non-transitory computer-readable storage medium of claim 13, wherein the one or more user interactions are associated with at least one of: a mouse hover operation, a mouse click operation, or a touch gesture operation.

20. The non-transitory computer-readable storage medium of claim 12, wherein the second portion depicts one or more points of interest, and the one or more points of interest are associated with at least one of a tagged object, a detected object, or a recognized object.

* * * * *